(12) United States Patent
Beales et al.

(10) Patent No.: US 6,968,154 B2
(45) Date of Patent: Nov. 22, 2005

(54) AVOIDANCE OF INTERFERENCE BETWEEN ITEMS OF ELECTRICAL APPARATUS

(75) Inventors: Stephen Beales, Saltaire (GB); Stuart Griffin, Shirley (GB)

(73) Assignee: Pace Micro Technology Plc, Saltaire (GB)

( * ) Notice: Subject to any disclaimer, the term of this patent is extended or adjusted under 35 U.S.C. 154(b) by 434 days.

(21) Appl. No.: 09/974,077

(22) Filed: Jan. 8, 2002

(65) Prior Publication Data

US 2002/0052184 A1 May 2, 2002

(30) Foreign Application Priority Data

Oct. 11, 2000 (GB) .............................................. 0024835

(51) Int. Cl.⁷ ............................ H04B 1/00; H04B 15/00
(52) U.S. Cl. .................... 455/63.1; 455/63.2; 455/63.3; 455/67.13; 455/501; 455/296; 455/114.2; 455/3.06; 455/3.02; 455/3.04; 348/274; 348/627; 348/683; 348/716; 348/729
(58) Field of Search .............................. 455/63.1, 3.06, 455/63.3, 63.2, 67.13, 3.02, 3.05; 348/716, 729

(56) References Cited

U.S. PATENT DOCUMENTS

| | | | | |
|---|---|---|---|---|
| 5,600,672 A | * | 2/1997 | Oshima et al. | 375/219 |
| 5,970,395 A | * | 10/1999 | Weiler et al. | 455/67.13 |
| 6,054,896 A | * | 4/2000 | Wright et al. | 330/149 |
| 6,313,703 B1 | * | 11/2001 | Wright et al. | 330/149 |
| 6,473,467 B1 | * | 10/2002 | Wallace et al. | 375/267 |

* cited by examiner

*Primary Examiner*—Marceau Milord
(74) *Attorney, Agent, or Firm*—Head, Johnson & Kachigian

(57) ABSTRACT

The invention relates to the simultaneous operation of items of electrical apparatus, such as but not exclusively, a broadcast data receiver and a DECT telephone system. A problem with this type of apparatus is that the operating frequencies of the same can overlap and in turn cause interference in the operation of the respective items. The invention provides a method for identifying the overlap of the RF ranges of the apparatus, and having identified the same, adjusting the operating characteristics of one of the items to allow the interference to be avoided or minimized and the opportunity for the items of apparatus to be combined into one unit.

13 Claims, 4 Drawing Sheets

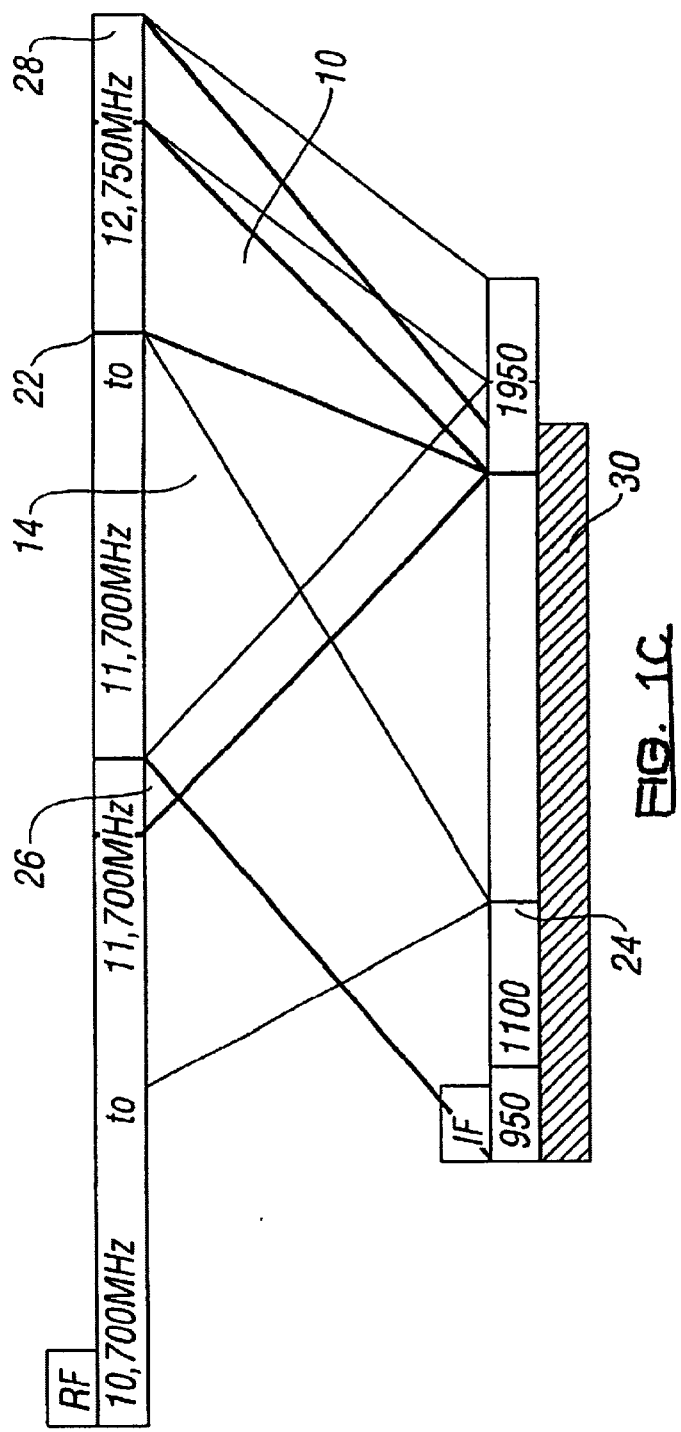
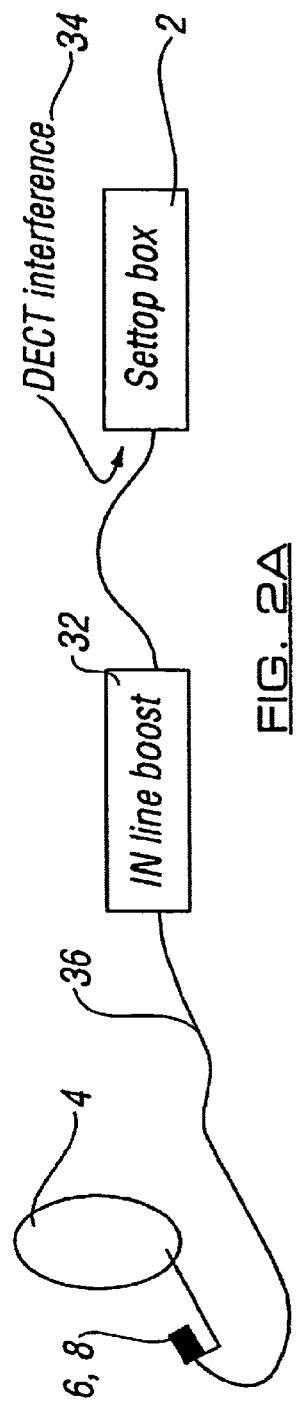
FIG. 1C
FIG. 2A

AVOIDANCE OF INTERFERENCE BETWEEN ITEMS OF ELECTRICAL APPARATUS

CROSS-REFERENCE TO RELATED APPLICATION

This application claims priority to British Patent Application No. 0024835.1 filed 11 Oct. 2000.

BACKGROUND OF THE INVENTION

The invention which is the subject of this application relates to the provision of methods and systems which allow the avoidance of interference being caused to the operation of a first item of electrical apparatus by the operation of a second item of electrical apparatus.

With the increasing prevalence of the use of items of electrical and electronic apparatus in a premises, there is an increasing risk of interference being caused by the use of one item of the apparatus on other items of apparatus.

One particular example of this and an example to which the invention is particularly, although not exclusively directed, is the operation of satellite broadcast data receiving apparatus and Digital Enhanced Cordless Telecommunication (DECT) telephone systems in premises. The particular problems of this example are now explained to illustrate the general problems which can be experienced.

Broadcast data receivers are used, in one embodiment in connection with a satellite receiver antenna and the apparatus, at least for domestic purposes can use a wide band $1^{st}$ Intermediate Frequency (IF) bandwidth from 950 to 2150 MHz. However other communication systems can also use frequencies within this band and therefore have the potential to cause interference to the broadcast data receiver apparatus and hence interfere and perhaps adversely affect the satellite TV reception and reproduction of the television programs to the viewer, generated via the broadcast data receiver connected to or provided integrally with the television set. One example of this is the operation of a DECT phone system which can operate at a frequency in the range 1897–1914 MHz or mobile phone base station which can typically operate at 1800 MHz.

The operation of these devices simultaneously can cause interference as the frequency ranges of operation overlap. This interference can lead to the manufacturer of the broadcast data receiving apparatus and or the data broadcaster being blamed for the apparatus operating incorrectly when in fact the faults in operation apparent to the user are not of their doing and may be caused by the user's other apparatus.

The aim of the present invention is therefore to provide a method and apparatus and an operating system for different items of apparatus in the same or adjacent premises so as to overcome the problem of interference from one item of apparatus causing faults is the operation of another apparatus.

SUMMARY OF THE INVENTION

In a first aspect of the invention there is provided a method of controlling the operating frequencies of at least two items of electrical apparatus to allow the simultaneous operation of the same with no or minimal frequency interference, said method comprising the steps of identifying the Intermediate Frequency(IF) and Radio Frequency(RF) ranges of each of the items of apparatus, comparing the same and, if there is an overlap in the respective RF ranges altering the operating conditions of one of the items of apparatus to minimize the opportunity for interference to occur.

In one embodiment when overlap of RF ranges is identified the overlapping part of the RF range of one of the items is mapped to an available space in the IF range so that the required RF range can be received without overlapping the RF range of the other item of apparatus. By mapping the radio frequency (RF) range of one of the items of apparatus to another location and allowing the item to have an IF in an available IF space so the start and end portions of the RF range are altered but the size of the range is maintained and the item of apparatus continues to operate in the same manner as far as the user is concerned but without the risk of interference.

In one embodiment, one of the items of apparatus is a broadcast data receiver with at least one Low Noise Block (LNB) for receiving satellite signals said LNB having three bands of operation, said bands selectable by the broadcast data receiver in dependence upon the required RF range for operation and the RF range of other apparatus in the vicinity so as to avoid interference.

Typically, the three bands of the LNB are the Low Band, High band and a third band in accordance with the invention. If selected, the Low Band of the LNB is mapped to a new IF value so as to have an RF range located so as not to overlap the RF range of the other item of apparatus. If the High Band of the LNB is selected for operation and there is an overlap in the RF range of this and the RF range of the other item of apparatus, the third band of operation for the LNB can be selected so as to allow the RF range to be mapped to RF values external of the RF range of the other item of apparatus.

The invention allows the items of apparatus to be at least partially incorporated into one unit and in one embodiment the first item of apparatus is a broadcast data receiver and the other item of apparatus is a DECT telephone system and the said telephone system is provided as an integral part of the broadcast data receiver.

In a further aspect of the invention during the operation of two items of electrical apparatus one of the items of apparatus receives a data signal which passes through a booster device which boosts the level of the data signal to a level above a predefined level so as to avoid data being lost due to interference from the operation of the other item of apparatus.

In accordance with this embodiment the booster device is selectively used to boost the data signal when the RF frequency of the first item of electrical apparatus overlaps the RF range of the other item of apparatus. In one embodiment the first item of apparatus is broadcast data receiving apparatus and the second item of apparatus is a DECT telephone system.

In a further aspect of the invention there is provided a booster device for use in the amplification of a data signal being carried to an item of apparatus, said booster device including an amplifier to allow the data signal to be boosted to a predefined level before reaching the said item of apparatus.

In one embodiment the booster device includes a first data signal path and a second data signal path, said first or second data signal path selectively used in accordance with the RF range of operation of the item of apparatus and the RF range of operation of a second item of apparatus.

In one embodiment the first data path does not boost the signal and the second data path does serve to amplify the data signal. Alternatively the first data signal path amplifies the data signal to a first level and the second data path amplifies the data signal to a second level and said data paths are selected in accordance with the RF operating value of the item of apparatus.

Thus there is provided a booster device with a plurality of data paths, said data paths selectively utilized to provide no amplification or one of predefined levels of amplification to the data signals.

BRIEF DESCRIPTION OF THE DRAWINGS

Specific embodiments of the invention are now described with reference to the accompanying drawings wherein:

FIGS. 1A–C illustrate the method in accordance with the first embodiment of the invention; and FIGS. 2A–B illustrate the method in accordance with the second embodiment of the invention.

DESCRIPTION OF THE DRAWINGS

Figure 1A:
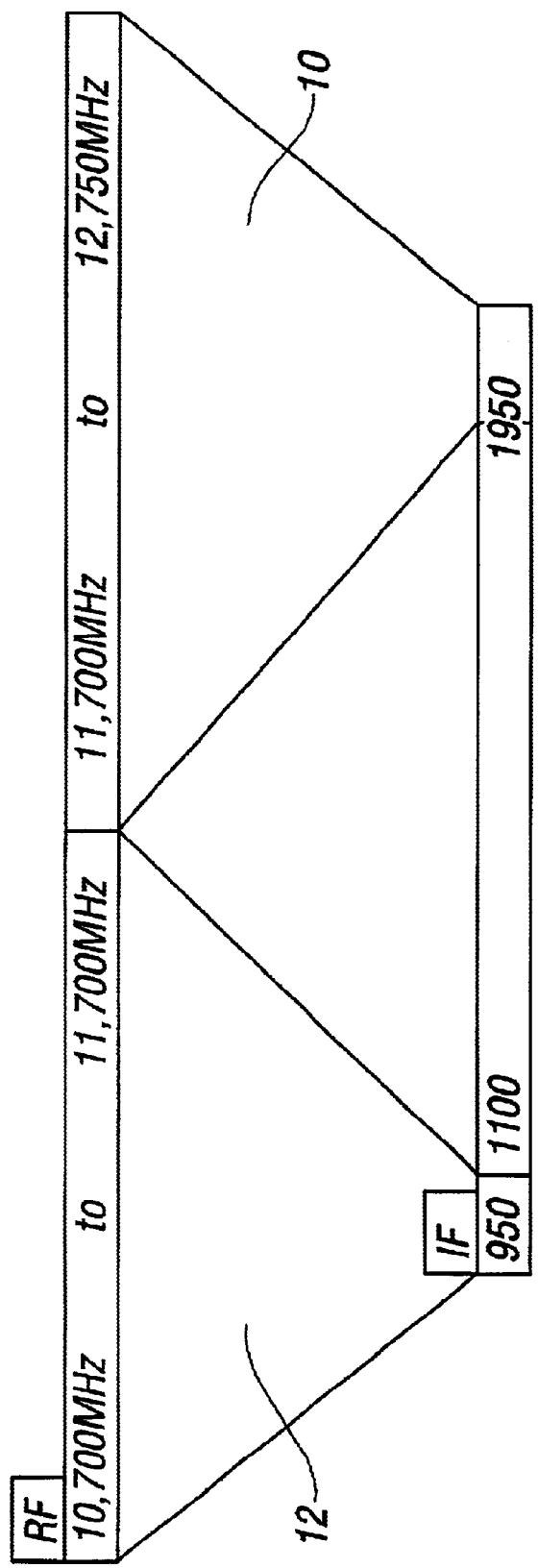
Figure 1B:
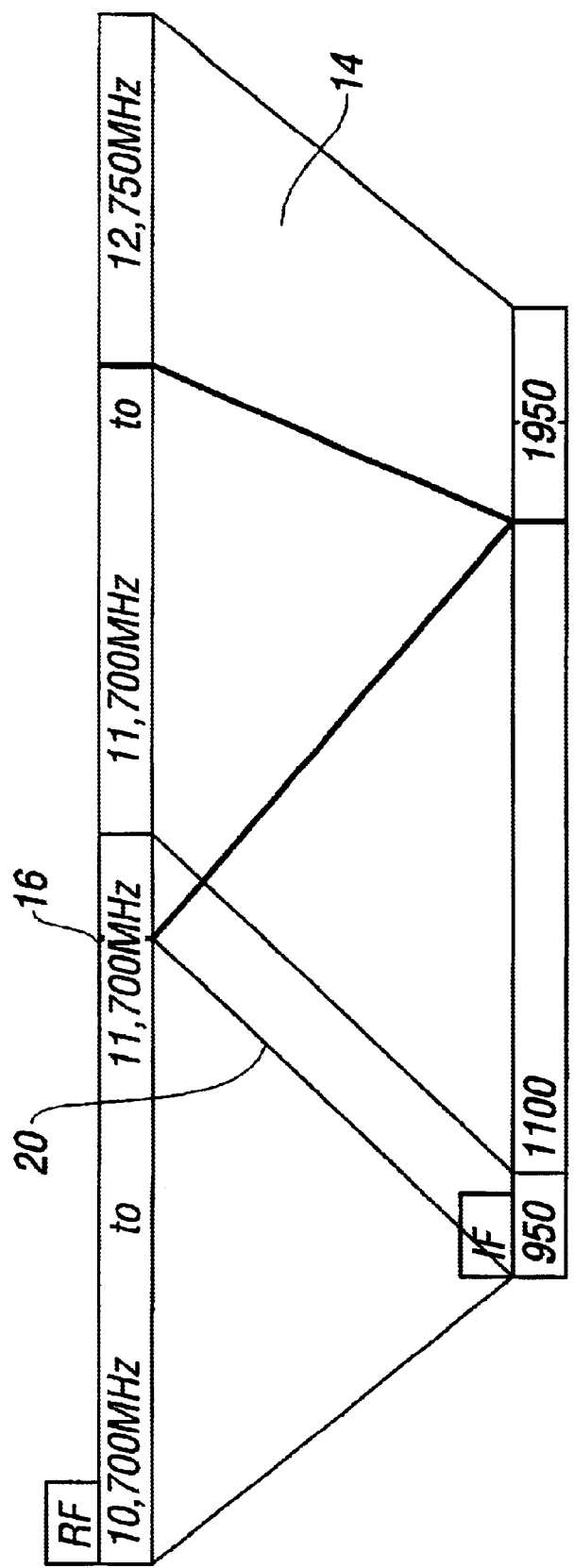

Referring firstly to FIGS. 1A–C these illustrate the method which maps the IF frequency of one item of apparatus to a different value so that the RF frequency range of that item of apparatus, while still the same size lies with different start and end frequency values so that the RF frequency portion which is normally corrupted by the interference signal from another item of apparatus is thereafter not used and so avoids the interference from occurring.

FIG. 1A illustrates the current or conventional RF mapping of broadcast data receiving apparatus, which is the first item of apparatus of this example. As illustrated in FIG. 2A, the broadcast data receiver apparatus comprises the broadcast data receiver 2 which receives data transmitted from a remote location via satellite dish receiver 4 mounted externally of the premises. The dish receiver 4 includes at least one Low Noise Block (LNB) conventionally operable at two settings 6,8 at two different frequency ranges, high or low band, 10,12 as shown FIG. 1A.

The Low Band 12 has an IF in the region of 950–1000 MHz and an RF of 10700 MHz to 11700 MHz, while the High band 10 has an IF in the region of 1950 MHz and an RF of 11700–12750 MHz.

In normal operation, as shown in FIG. 1A, there is no interference, however if another item of apparatus is operated as the same time, as illustrated in FIG. 1B then that item of apparatus, in this example, causes interference as it has an IF of 1800 MHz, 14 and interference can occur on both of the Low Band 12 and High Band 10 LNB operations, depending on which mode is chosen.

Thus, in practise, with an interference frequency occurring at 1800 MHz the two RF ranges are affected depending on whether high or low band is selected as illustrated with respect to FIG. 1B. This interference can cause malfunctioning of the processing of the received data and hence the generation of poor quality or no television program on the television set typically connected with the broadcast data receiver.

In accordance with the invention, if the Low Band 12 mode of operation is chosen, the reception of the RF frequency 11550 MHz 16 is affected by the interference caused by the operation of the further item of apparatus at 1800 MHz as shown in FIG. 1B. In accordance with the invention, by selecting to use the high band mode of the LNB 10 to cover the RF at the value affected, 11550 MHz, the low band is mapped to 950 MHz and can be received without interference as its RF range is no longer overlapped by the RF range 14 of the second item of apparatus as shown by the line 20 which does not overlap the range 14 of the said second item of apparatus.

Alternatively if the, High band mode of the LNB is selected, the reception of the RF frequency 12400 MHz, 22, is affected by the RF range 14 of the second item of apparatus operating at 1800 MHz. To map this radio frequency range to a different IF frequency a new Local Oscillator (LO) frequency for the LNB is required as illustrated in FIG. 1C and this is in effect creating a third band which can be selected so that there are now three modes, the Low Band, High Band and third band of operation of the LNB. By using the third band, the RF range between 11700 to 12400 MHz is mapped to 1650 MHz and can be received without interference with the exception of portion 26 which still overlaps the RF range 14 of the other item of apparatus but this portion is mapped using the third band 30 at the RF 12750 MHz 28, as shown in FIG. 1C and so for the part of the RF range of the High Band mode where interference would previously have occurred, interference no longer occurs as this part is mapped to be received by the third operating band of the LNB Thus, the use of this method and the 3 band LNB allows the avoidance of interference in the IF domain above 1.8 GHz thus avoiding the possibility of interference being caused by the operation of a second item of apparatus, such as a mobile phone base station and/or DECT telephone system. Selection of the new band can in one embodiment be achieved by using the Digital Satellite Equipment (DiSEq) control apparatus which is provided with the broadcast data receiving apparatus.

This method of avoiding the interference frequencies of operation by another item of apparatus makes the broadcast data receiver immune to the interference and in turn allows the other item of apparatus to be incorporated or provided integrally with the first item of apparatus as there is no longer the problem of interference. In one example a DECT telephone system can be provided as an integral part of the broadcast data receiver whereas previously they would be required to be kept as far as possible apart in the premises.

An alternative method of the invention is shown with reference to FIGS. 2A and B.

The satellite data receiving apparatus of FIG. 2A is as described previously with respect to the first embodiment. The second item of apparatus causing interference in this example is a DECT telephone system 34.

Figure 2B:
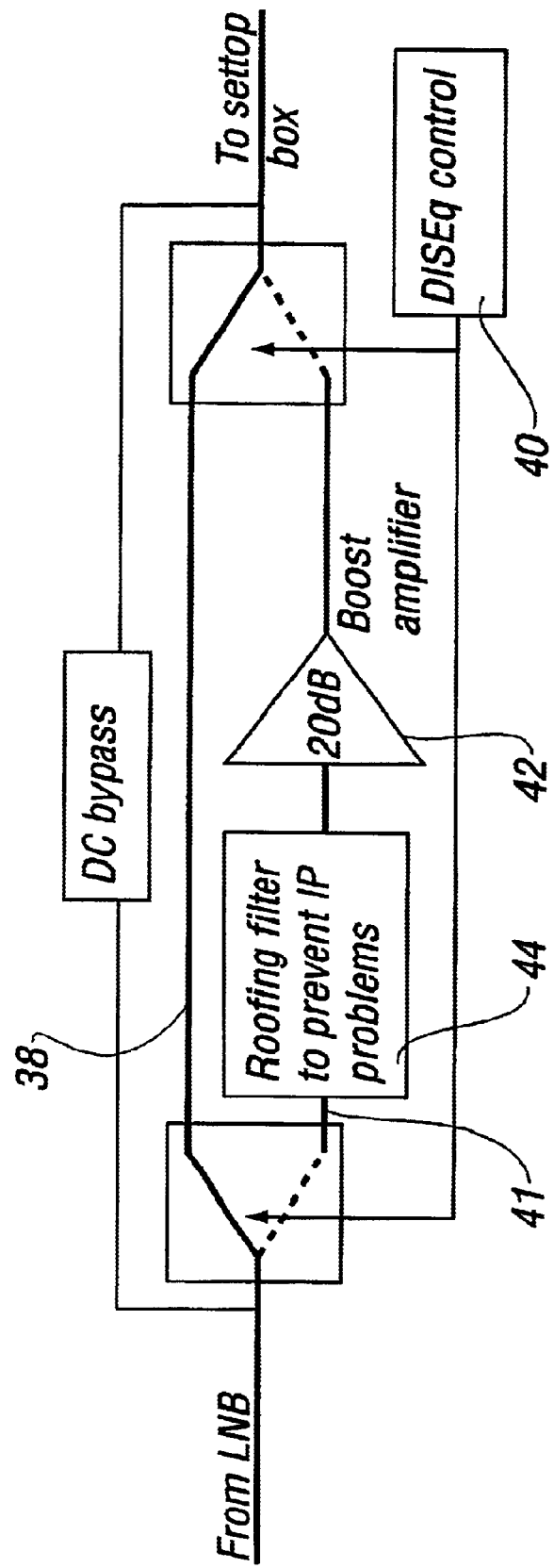

In accordance with this embodiment the interference is avoided by increasing the data signal strength from the LNB to the broadcast data receiver. Thus the data signal from the LNB 6,8 passes through a boosting device 32 intermediate the LNB and the broadcast data receiver 2. This method utilizes an increase in the power via an inline boost of the selected data signal, that going to the broadcast data receiver over the interference signal as illustrated in FIG. 2A. The booster device circuit of FIG. 2B is inserted into the RF line 36 between the broadcast data receiver and the LNB mounted at the satellite dish receiver, and preferably immediately after the LNB, but preferably as far away from the DECT interference source as possible.

The booster device is powered from the LNB power supply voltage and controlled by DiSEq control 40. In normal mode with no operation of the DECT telephone system and hence no interference the data signals are passed along line 36 without boosting via the data signal path bypass line 38 in the booster device. However when the DECT telephone system is operating and/or the broadcast data receiver is tuned to a predefined frequency within the known RF range of the DECT telephone system the broadcast data receiver and/or DiSEq controls the operation of the apparatus to cause the data signal to pass through the data signal path 41 and booster device amplifier 42 which increases the signal power relative to the interference. The level of increase in signal power can be determined with respect to the level required to raise the data signal above the interference being caused. It is also possible that each of the lines through the booster device can provide amplification of the data signal but to different levels depending on the frequency to which the broadcast data is tuned and the corresponding interference levels. The booster device may also include a range of different paths with different amplification levels through which the data signal can pass.

The booster amplifier can in one embodiment have a noise figure up to 10 dB which in itself is undesirable and so can be minimized as required. A roofing filter 44 is provided to prevent intermodulation problems from occurring in the tuner of the broadcast data receiver.

This solution can be fitted to existing equipment where interference is causing a problem as an alternative to fitting a new LNB with a third band as required in the first embodiment.

Thus the present invention offers solutions for avoiding interference of one item of electrical apparatus from another item of electrical apparatus such as DECT telephone systems.

The first embodiment avoids using the DECT frequencies within the satellite first IF band and is a very robust method but does require using a three band LNB and is therefore best suited perhaps at the time of installation of new apparatus which requires a high degree of immunity from interference. (e.g. when the DECT base station is part of the broadcast data receiver).

The second embodiment boosts the required signal above the level where interference from the other item of apparatus will cause data dropout. The embodiment does not require change to the existing apparatus other than to add the booster device in the data line and for this reason is of advantage in retro fitting to existing apparatus systems.

However in which ever embodiment the invention of adjusting the operating characteristics of one item of apparatus to avoid interference being caused by another is advantageous and allows the operation of items of apparatus within a proximity which otherwise would not be possible.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of controlling the operating frequencies of at least two items of electrical apparatus to allow the simultaneous operation of the same with no or minimal frequency interference, said method comprising the steps of:
identifying the intermediate frequency and radio frequency ranges of each of the items of apparatus;
comparing the same; and
if there is an overlap in the respective radio frequency ranges, a portion of the radio frequency range of one of the items is mapped to an available space in the intermediate frequency range so that the required radio frequency range can be received without overlapping the radio frequency of the other item of apparatus.

2. A method according to claim 1 wherein mapping the radio frequency range of one of the items of apparatus to another location and allowing the item to have an immediate frequency in an available immediate frequency space so the start and end portions of the radio frequency range are altered but the size of the range is maintained.

3. A method according to claim 1 wherein one of the items of apparatus is a broadcast data receiver with at least one low noise block for receiving satellite signals said low noise block having three bands of operation, said bands selectable by the broadcast data receiver in dependence upon the required radio frequency range for operation and the radio frequency range of other apparatus in the vicinity so as to avoid interference.

4. A method according to claim 3 wherein if selected, a low band of the low noise block is mapped to a new intermediate frequency value so as to have a radio frequency range located so as not to overlap the radio frequency range of the other item of apparatus.

5. A method according to claim 3 wherein if a high band of the low noise block is selected for operation and there is an overlap in the radio frequency range of this and the radio frequency range of the other item of apparatus, a third band of operation for the low noise block can be selected so as to allow the radio frequency range to be mapped to radio frequency values external of the radio frequency range of the other item of apparatus.

6. A method according to claim 1 wherein said at least two items of electrical apparatuses are at least partially incorporated into one unit.

7. A method according to claim 6 wherein a first item of apparatus is a broadcast data receiver and the other item of apparatus is a digital enhanced cordless telecommunication telephone system and the said telephone system is provided as an integral part of the broadcast data receiver.

8. A method according to claim 1 wherein during the operation of at least two items of electrical apparatuses one of the items of apparatus receives a data signal which passes through a booster device which boosts the level of the data signal to a level above a predefined level so as to avoid data being lost due to interference from the operation of the other item of apparatus.

9. A method according to claim 8 wherein the booster device is selectively used to boost the data signal when the radio frequency range of the first item of electrical apparatus overlaps the radio frequency range of the other item of apparatus.

10. A method according to claim 8 wherein the first item of apparatus is broadcast data receiving apparatus and the second item of apparatus is a digital enhanced cordless telecommunication telephone system.

11. A booster device for connecting to an item of apparatus for use in the amplification of a data signal being carried to said item of apparatus, said booster device comprising:
an amplifier to allow the data signal to be boosted to a predefined level before reaching the item of apparatus;
a first data signal path and a second data signal path, said first or second data signal path selectively used in accordance with the radio frequency range of operation of the item of apparatus and the radio frequency range of operation of a second item of apparatus; and
wherein said first data signal path does not boost a signal and said second data path does serve to amplify the data signal.

12. A booster device according to claim 11 wherein said first data signal path amplifies the data signal to a first level and said second data signal path, amplifies the data signal to a second level and said data paths are selected in accordance with the radio frequency operating value of the item of apparatus.

13. A booster device according to claim 11 including a plurality of data paths, said data paths selectively utilized to provide no amplification or one of predefined levels of amplification to the data signals.

* * * * *